G. W. KING.
LOCKING DEVICE FOR DIFFERENTIAL GEARS.
APPLICATION FILED MAR. 24, 1914.
1,168,812.
Patented Jan. 18, 1916.
2 SHEETS—SHEET 1.
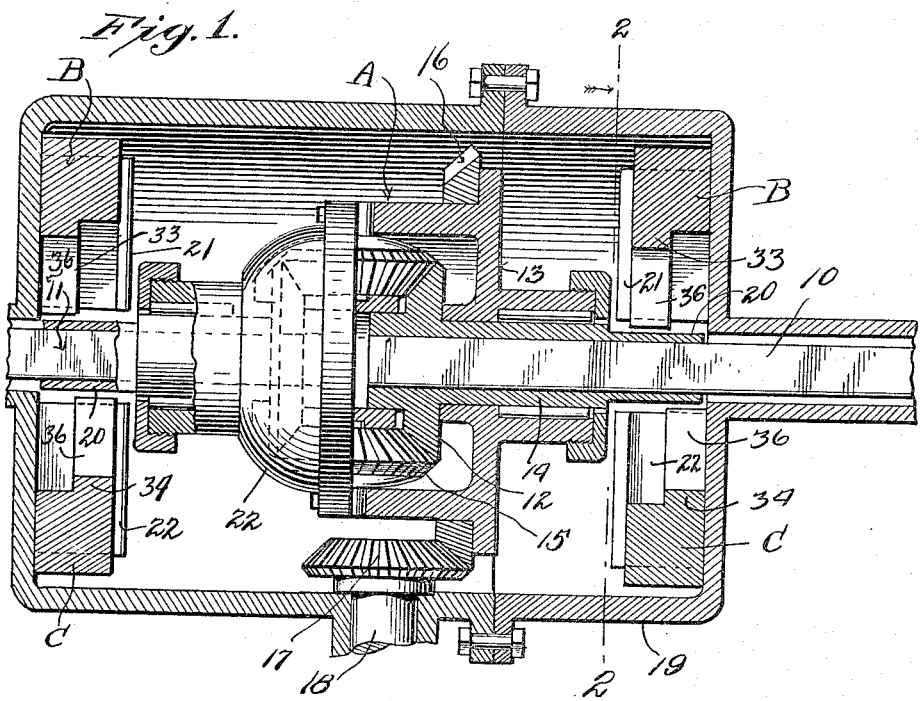
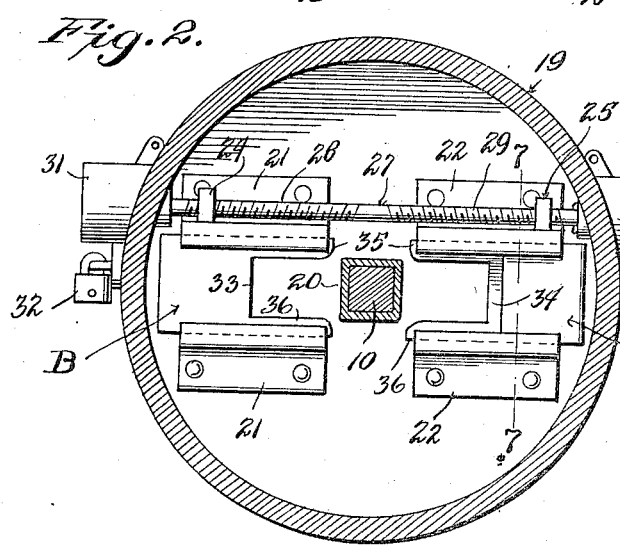
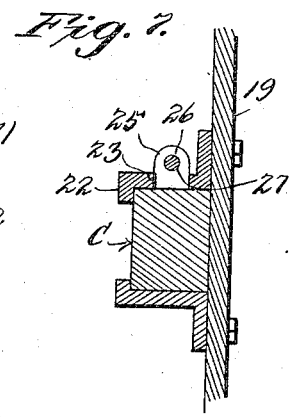
Witnesses
Inventor
G. W. King.
By Chandler & Chandler
Attorneys.

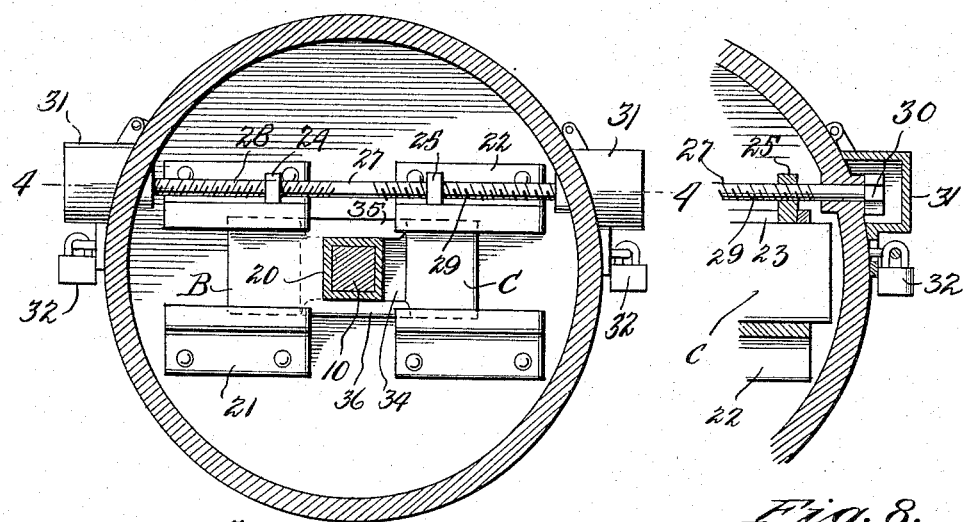

UNITED STATES PATENT OFFICE.

GEORGE W. KING, OF RIO GRANDE, TEXAS.

LOCKING DEVICE FOR DIFFERENTIAL GEARS.

1,168,812.  Specification of Letters Patent.  Patented Jan. 18, 1916.

Application filed March 24, 1914. Serial No. 826,892.

*To all whom it may concern:*

Be it known that I, GEORGE W. KING, a citizen of the United States, residing at Rio Grande, in the county of Starr, State of Texas, have invented certain new and useful Improvements in Locking Devices for Differential Gears; and I do hereby declare the following to be a full, clear, and exact description of the invention, such as will enable others skilled in the art to which it appertains to make and use the same.

This invention relates to locking devices for differential gears adapted especially for use in connection with automobiles using the "full floating" type of rear axle.

In the use of automobiles it does not infrequently happen that one of the sections of the rear axle becomes broken, damaged or otherwise put out of commission when it is undesirable to further subject the broken or damaged section of the axle to the driving strain of the connecting differential.

It is therefore the object of the present invention to provide a simple and efficient locking device whereby either of the sections of the full floating rear axle of an automobile may be locked against rotation and thus relieved of the driving strain of the differential in the event such section should become broken, damaged or otherwise put out of commission.

A further object of the invention resides in the provision of a locking device of the character referred to so constructed and arranged that it can be associated with little expense with an automobile rear axle and differential of ordinary and usual construction.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a longitudinal sectional view through the differential gear of an automobile and showing the invention applied; Fig. 2, a section on the line 2—2 of Fig. 1, the elements of the locking device in this view being positioned to permit free rotation of the adjacent axle section; Fig. 3, a view similar to Fig. 2 showing the elements of the locking device positioned to secure the adjacent axle section against rotation; Fig. 4, a section on the line 4—4 of Fig. 3; Fig. 5, a view in elevation of the beveled gear fixed on the inner end of each axle section; Fig. 6, a perspective view of one of the locking blocks employed in the invention; Fig. 7, a section on the line 7—7 of Fig. 2, and Fig. 8, a sectional view disclosing the hinged cover which is adapted to be locked in position to prevent access to the lead screw of the device for the purpose of operating the screw to dispose the parts of the device in locking position with respect to the adjacent axle section.

Referring to the drawings A indicates generally a differential gear in which is included the inner ends of adjacent axle sections 10 and 11 of a "full-floating" type of rear axle, said inner ends of the axle sections being of square cross section for a purpose that will presently appear. The differential gear A further includes beveled gears 12 fixed on respective axle sections 10 and 11, a gear casing 13 rotatably mounted on hubs 14 formed on respective gears 12, pinions 15 rotatably mounted on the casing 13 and meshing with the gears 12, an external beveled gear 16 fixed on the casing 13, and a beveled gear 17 meshing with the beveled gear 16 and fixed on the usual drive shaft 18, said drive shaft 18 being rotatably engaged in a fixed casing 19 surrounding the differential gear A and of the usual and well known construction.

As the locking devices associated with the axle sections 10 and 11 are identical in every respect only the locking device associated with the axle section 10 will be described in detail and the reference characters employed will be applied to corresponding parts of the locking device associated with the axle section 11. The end of the hub 14 remote from the beveled gear 12 fixed on the axle section 10 is squared as at 20 for a purpose that will presently appear. Mounted on the end of the casing 19 adjacent the axle section 10 on opposite sides of said axle section are guide members 21 and 22 respectively. Slidably mounted between the guide members 21 is a locking block B, while a locking block C is slidably mounted between the guide members 22. Corresponding guide members 21 and 22 are provided with longitudinal slots 23 through which project respectively ears 24 and 25 formed on the locking blocks B and C. These ears 24 and 25 are provided respectively with reversely threaded openings 26 through which is engaged a lead screw 27 provided with oppositely threaded portions 28 and 29 and having its terminals rotatably mounted in the casing 19.

Formed on the ends of the lead screw 27 exteriorly of the casing 19 are heads 30 suitably shaped to permit the application of a wrench for the purpose of rotating the screw. Pivoted upon the outer side of the casing 19 adjacent each end of the screw 27 is a hood 31 adapted to be moved into covering relation to the adjacent head 30 and secured in such position by a locking device 32 whereby access to either of the heads 30 for the purpose of rotating the screw 27 is prevented. When it is desired to rotate the screw the device 32 may be readily unlocked by the proper person and the hood or cover 31 swung on its pivot to permit the desired access to the head 30.

The adjacent ends of the locking blocks B and C are oppositely reduced as at 33 and 34 respectively and these reduced portions are provided with recesses to form arms 35 and 36 which are adapted to pass into embracing relation with the squared portion 20 of the hub 14 when the blocks B and C are moved toward each other which will effectually lock the shaft section 10 against rotation. At the same time the arms 35 and 36 pass into embracing relation to the squared portion 20 they will also pass into overlapping relation with respect to each other with the ends of the arms 35 and 36 of the block B disposed between the guide members 22 and the ends of the arms 35 and 36 of the block C disposed between the guide members 21. By overlapping the arms 35 and 36 and disposing same between guide members when the arms are in locking position the strength of the lock is materially enhanced.

It is to be noted that this invention is intended for use in connection with the "full-floating" type of rear axle, wherein the two sections of the rear axle may be drawn bodily from the housing. Now, keeping in mind that each back wheel is fixed to its corresponding axle section, it will be apparent that if the inner end of one of the sections is locked against rotation because of the breaking of such section at a point between where the inner end portion of the section is locked and the wheel, such wheel will rotate with the outer broken off section of the axle, independently of the inner locked section of such broken axle. This will occur because the outer end portion of the broken axle, with its wheel, turns on the usual housing bearing, well known in connection with "full-floating" axles. The locking of the inner section of the broken axle will thus permit the differential to work to effect the operation of the other rear wheel, or that on the unbroken shaft.

While one particular form of carrying the invention into practice has been illustrated and described various modifications and changes can be resorted to without departing from the scope of the invention as set forth in the appended claims.

What is claimed is:—

1. The combination with rotatable axle sections, a differential gear connecting said sections, and a fixed member overlying the adjacent ends of said sections, of means carried by the fixed member and engageable respectively with the axle section to lock the latter against rotation.

2. The combination with rotatable axle sections, a differential gear connecting said sections, and a fixed member overlying the adjacent ends of said sections, of a pair of locking blocks slidably mounted on the fixed member adjacent each axle section and adapted to interlock with the latter when moved toward each other to secure the axle section against rotation, and means for moving the blocks of each pair toward and away from each other.

3. The combination with rotatable axle sections, a differential gear connecting said sections, and a fixed member overlying the adjacent ends of said sections, of a pair of locking blades slidably mounted on the fixed member adjacent each axle section, spaced arms on the adjacent ends of said locking blocks adapted to move into embracing relation to a squared portion of an adjacent axle section and into overlying relation with respect to each other, and means for moving the locking blocks of each pair toward and away from each other.

4. The combination with rotatable axle sections, a differential gear connecting said sections, and a fixed member overlying the adjacent ends of said sections, of spaced guide members mounted on the fixed member on respective sides of each axle section, a locking block slidably mounted between each pair of guide members, a pair of locking blocks coöperating with the same axle section and having their adjacent ends oppositely reduced and recessed to form arms adapted to move into embracing relation with a squared portion of the adjacent axle section and into overlying relation with respect to each other, and means for moving said locking blocks toward and away from each other.

5. The combination of rotatable axle sections, a differential gear connecting said sections, and means for locking either of said sections against rotation.

In testimony whereof, I affix my signature, in the presence of two witnesses.

GEORGE W. KING.

Witnesses:
HENRY G. BRIGHT,
HARRY M. TEST.